US011070461B1

(12) United States Patent
Jaggi (10) Patent No.: US 11,070,461 B1
(45) Date of Patent: Jul. 20, 2021

(54) SYSTEM FOR DIVIDING A TREE DATA STRUCTURE TO IMPROVE TRAVERSAL OPERATIONS

(71) Applicant: AMAZON TECHNOLOGIES, INC., Seattle, WA (US)

(72) Inventor: Ayush Jaggi, Ghaziabad (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 843 days.

(21) Appl. No.: 15/464,072

(22) Filed: Mar. 20, 2017

(51) Int. Cl.
*H04L 12/751* (2013.01)
*H04L 12/715* (2013.01)

(52) U.S. Cl.
CPC .............. *H04L 45/04* (2013.01); *H04L 45/02* (2013.01)

(58) Field of Classification Search
CPC ....................................................... H04L 45/04
USPC ......................................................... 707/718
See application file for complete search history.

(56) References Cited

U.S. PATENT DOCUMENTS

| | | | | | |
|---|---|---|---|---|---|
| 5,873,081 | A | * | 2/1999 | Harel ..................... | G06F 16/335 707/E17.059 |
| 6,654,761 | B2 | * | 11/2003 | Tenev .................. | G06F 16/9024 |
| 7,096,356 | B1 | * | 8/2006 | Chen ..................... | H04L 9/0836 380/44 |
| 9,008,303 | B1 | * | 4/2015 | Juels ..................... | H04L 9/0869 380/44 |
| 2001/0045952 | A1 | * | 11/2001 | Tenev .................... | G06T 11/206 345/440 |
| 2002/0147842 | A1 | * | 10/2002 | Breitbart ............... | H04L 45/124 709/241 |
| 2004/0252904 | A1 | * | 12/2004 | Fisher .............. | H04N 21/23412 382/253 |
| 2007/0208693 | A1 | * | 9/2007 | Chang .................. | G06F 16/9024 |
| 2008/0016074 | A1 | * | 1/2008 | Ben-dyke ........... | G06F 16/2246 |
| 2010/0077104 | A1 | * | 3/2010 | O'Neal .................... | H04L 67/10 709/252 |
| 2010/0215051 | A1 | * | 8/2010 | Solis ........................ | H04L 45/54 370/408 |
| 2011/0080854 | A1 | * | 4/2011 | Farkas ..................... | H04L 41/12 370/256 |
| 2011/0131199 | A1 | * | 6/2011 | Simon ............... | G06F 16/24542 707/714 |
| 2011/0173455 | A1 | * | 7/2011 | Spalka .................. | H04L 9/0863 713/189 |

(Continued)

FOREIGN PATENT DOCUMENTS

WO     WO 03/079155    *   9/2003

*Primary Examiner* — Pierre M Vital
*Assistant Examiner* — Andrew N Ho
(74) *Attorney, Agent, or Firm* — Lindauer Law, PLLC (57) ABSTRACT

Described are techniques for efficiently traversing a tree data structure to determine responses to queries by first dividing the tree data structure into linear chains of nodes. Linear chains may be formed by beginning at an initial node, including the child node of the initial node that has the largest number of descendant nodes, and proceeding to include child nodes associated with the largest number of descendant nodes until a node lacking child nodes is reached. Additional chains may then be formed by beginning at an initial node not included in previous linear chains and repeating the process. Responsive to a received query, traversal of each linear chain encountered along a query path may be performed more efficiently than other traversal algorithms that traverse a tree data structure until an end node is reached.

20 Claims, 6 Drawing Sheets

(56) References Cited

U.S. PATENT DOCUMENTS

| | | | | |
|---|---|---|---|---|
| 2013/0060753 | A1* | 3/2013 | Lukichev | G06F 16/2456 707/718 |
| 2013/0218899 | A1* | 8/2013 | Raghavan | G06F 16/156 707/741 |
| 2013/0339352 | A1* | 12/2013 | Jin | G06Q 10/047 707/736 |
| 2014/0136468 | A1* | 5/2014 | Faratin | G06F 16/322 706/55 |
| 2015/0091909 | A1* | 4/2015 | Ajwani | G06T 11/206 345/440 |

* cited by examiner

SYSTEM FOR DIVIDING A TREE DATA STRUCTURE TO IMPROVE TRAVERSAL OPERATIONS

BACKGROUND

Data may be stored in various types of data structures, including a vertex-edge graph in which each node (e.g., vertex) stores a particular value and is connected to one or more other nodes by respective edges. Queries requesting the sum of nodes along a path between two given nodes (e.g., path sum queries) may be resolved by traversing the graph to determine the shortest path between two given nodes.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

One type of data structure used to store values and associations between values is a vertex-edge graph in which multiple vertices, also termed nodes, each store respective values, and are connected to one or more other vertices by edges. One specific type of vertex-edge graph is a tree data structure. In a tree data structure, the graph is acyclic, such that any two nodes are connected by exactly one path. Tree structures are also undirected, and the edges themselves do not store values (e.g., weights) but simply serve to connect associated nodes. Thus, a node of a tree data structure may indicate not only the particular value stored in the node, but also the relationship of that value to other nodes. For example, a tree data structure may begin at a root node, to which one or more child nodes may be connected. Each child node connected to the root node may in turn serve as a parent node to one or more subsequent child nodes, which may in turn serve as parent nodes to additional child nodes, and so forth. Thus, each node within a tree data structure, with the exception of the root node, may be connected to one parent node. Additionally, each node within a tree data structure may be connected to any number of child nodes. Nodes to which no child nodes are connected may be termed leaf nodes or end nodes.

A path sum query may be used to determine values associated with a tree data structure. For example, a path sum query may indicate two nodes within the tree data structure, requesting the sum of the values of each node along the path connecting the two nodes. As noted above, in a tree data structure, exactly one path connects any two given nodes. Therefore, to generate a response to the query, the graph may be traversed to determine the particular nodes included in the path between the two nodes referenced by the query. Numerous traversal algorithms exist to determine the path between nodes. For example, Djikstra's algorithm assigns a distance value to each node, determines which nodes within a graph have been previously traversed, and moves from a current node to the unvisited neighboring node having the smallest distance value. The time complexity for traversing a tree data structure using Djikstra's algorithm, in which the edge weight of each edge would be set as 1, would be $O(E \, Log(N))$, where E is the number of edges and N is the number of nodes in the graph. Other methods for traversing tree or graph structures include a depth-first-search (DFS) and a breadth-first-search (BFS). A DFS begins at the root node of a tree data structure and traverses as far as possible along a branch (e.g., until a leaf node having no child nodes is reached), before backtracking until a node having unvisited child nodes is reached. A BFS begins at the root node of a tree data structure and traverses to each direct child of the root node first, then each direct child of those child nodes, and so forth, traversing an entire level of a tree before descending to the next generation of child nodes. Because only a single path exists between two nodes in a tree data structure, the time complexity for traversing a tree data structure using a BFS would be $O(|N|)$, where N is the number of nodes in the tree.

When querying tree data structures having large numbers of nodes, the traversal of a significant number of nodes that are not associated with the path between two queried nodes may consume significant time and computational resources. For example, traversing an entire branch of a tree until each leaf node associated with the branch is reached may consume a large quantity of time and computational resources when the branch is not associated with the path between the queried nodes. Described in this disclosure are techniques for traversing a tree data structure more efficiently than existing traversal algorithms by dividing a tree data structure into multiple linear chains of nodes. A linear chain of nodes may include nodes that have, at most, a single parent node and a single child node. Nodes located at either end of the linear chain of nodes may lack a parent node or a child node.

A tree data structure may include a large number of nodes. With the exception of the root node, each node will have one parent node. Additionally each node may have any number of child nodes. Traversing nodes within a branched tree data structure may include traversing through nodes that have more than one associated child node. The traversal operation may then select one branch of the tree to traverse, then after a leaf node is reached, the traversal operation may backtrack to previous nodes having unvisited children. Conversely, when traversing a linear chain of nodes, a traversal operation may not select from among multiple branches to traverse or backtrack to previously-traversed nodes. Thus, the time complexity for traversing a linear chain of nodes may be O(log(N)), where N is the number of nodes in the linear chain. While a query may indicate two nodes in different linear chains, the traversal of each linear chain that intersects the path between the two nodes may be more efficient than existing traversal algorithms. For example, if every node along the query path was associated with a different respective linear chain, the maximum time complexity for traversing each linear chain along the query path would be O(log (N)*log(N)), which is more efficient than use of Djikstra's algorithm or BFS, for example.

A tree data structure may be divided into one or more linear chains of nodes by beginning at a first node within the tree data structure. In some implementations, the first linear chain of nodes may be formed by beginning at the root node of the tree data structure. If the first node is associated with one or more child nodes, then a child node may also be included in the linear chain. Specifically, if the first node is associated with multiple child nodes, the child node having the greatest number of descendant nodes associated therewith may be included in the chain. If multiple child nodes each have an equal greatest number of descendant nodes, any of the multiple child nodes may be included in the chain. For example, in such cases, one of the multiple child nodes may be selected at random or using other factors. Other child nodes of the first child node are not included in the linear chain. If the first node is associated with only a single child node, then the single child node may be included in the linear chain. After adding a child node to the linear chain, the chain may be extended by determining the child nodes associated with the added child node and determining which of the additional child nodes is associated with a greater number of descendant nodes than the other child nodes. This process may continue until a leaf node having no child nodes is reached. The process for forming a linear chain may then be initiated beginning at another node not included in the first linear chain, such as a child node of an included node that was not included in the first linear chain in favor of including a different child node of the included node. In some cases, a linear chain may include only a single node. For example, the child of an included node may not itself have any other child nodes associated therewith. In such a case, the child node may be included in a chain as a single node.

Formation of linear chains of nodes by including child nodes having the greatest number of descendant nodes may improve the efficiency of traversal within the tree data structure. For example, while traversal within a linear chain of nodes may have a time complexity of O(log(N)), when traversing from a first chain to a second chain at a lower level within the tree data structure, the second chain may be assumed to be smaller than the first chain. Continuing the example, because the child node having the greatest number of descendants was included in the first chain, traversing to a second chain that includes a child node having a smaller number of descendants ensures that the maximum size of the second chain is at least one node less than the size of the first chain.

In some implementations, when one or more new nodes are added to a tree data structure, the new nodes may be included in additional linear chains without modifying the existing linear chains. For example, when a tree data structure includes a large number of nodes, or when nodes are frequently added to a tree data structure, restarting the process to generate linear chains may consume a large quantity of time and computational resources. Conversely, adding one or more new linear chains that include newly added nodes may be a relatively efficient process.

Implementations within the scope of the present disclosure may be used to determine information from any type of data stored in a tree data structure. For example, items offered for sale within an online catalog may be stored in a hierarchal tree data structure in which certain nodes may be associated with categories, sub-categories, particular items, characteristics of items, and so forth. Traversal operations performed with regard to an online catalog may determine information regarding particular items, categories, or groups of items or categories, such as a degree of common attributes between items. Use of implementations described herein may reduce the number of computations performed and the time consumed when traversing an online catalog when compared to a DFS, BFS, or other type of traversal algorithm. A tree data structure may also store financial or accounting data, and a traversal operation may be used to calculate or retrieve values associated with one or more nodes. For example, a traversal operation may be used to determine characteristics of a financial transaction, such as the tax, commission, or sale price associated with the purchase of an item. Continuing the example, a particular transaction may be identified or differentiated from other transactions based on selected attributes that may be determined using data stored in a tree data structure. In some cases, one or more attributes of the particular set may be determined using a traversal operation.

Implementations described herein may also be used in various network applications, such as determining a path of network elements that route a data packet. For example, network elements may be arranged in a tree structure, and traversal of such a structure may determine information regarding the handling of a data packet more efficiently than other types of traversal algorithms.

Figure 1:
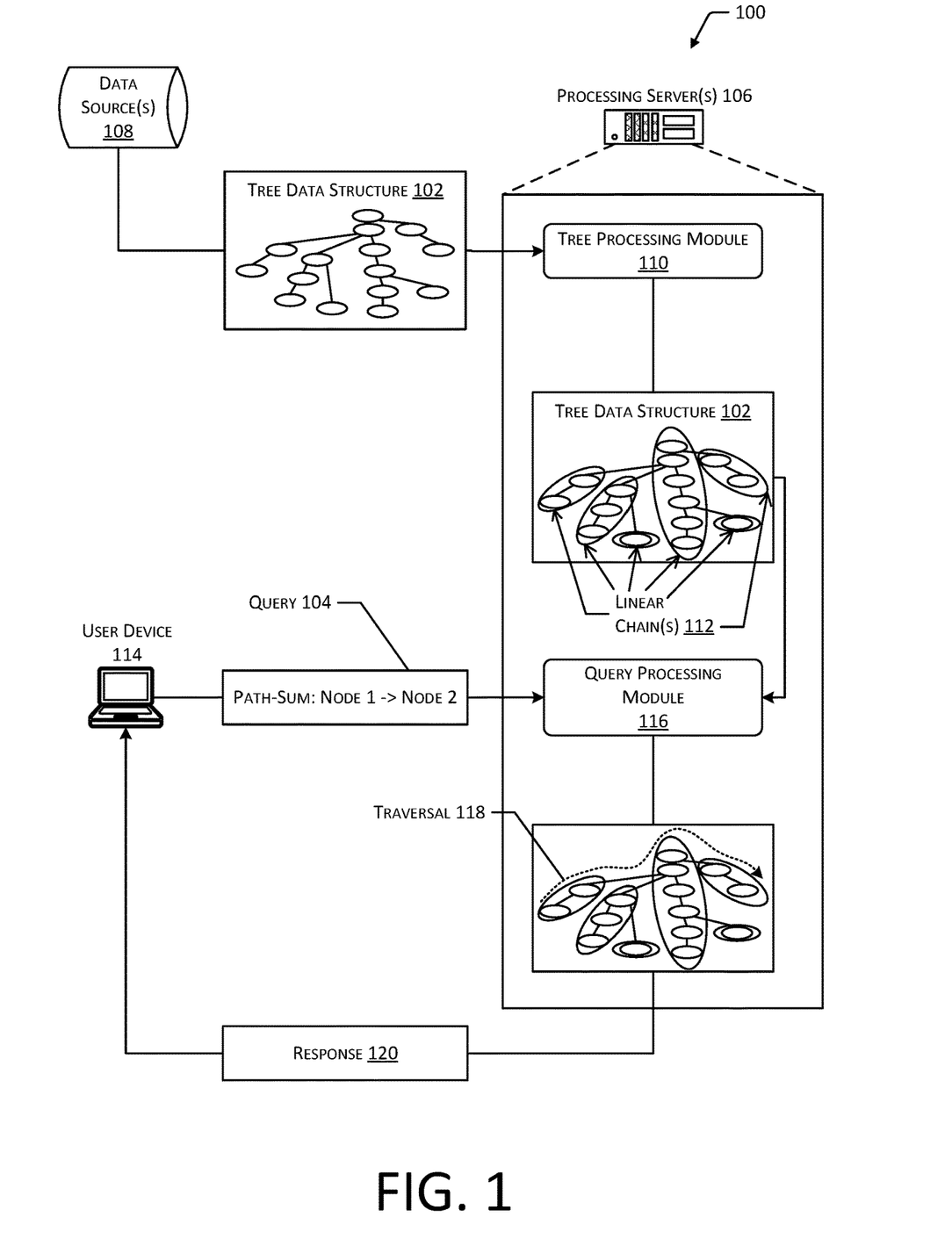
FIG. 1 depicts an implementation of a system for processing a tree data structure and traversing the tree data structure to generate a response to a query.

FIG. 1 depicts an implementation of a system 100 for processing a tree data structure 102 and traversing the tree data structure 102 to generate a response to a query 104. A tree data structure 102 may include multiple nodes, each node connected to at least one other node by at least one edge, and each node storing one or more values or an indication of a null value. For example, each node of the tree data structure 102 may represent a category of items available in an online catalog, sub-categories of items, characteristics of the categories or sub-categories, individual items, or characteristics of the items. Based on the data stored in the tree data structure 102 commonalities and differences between items and categories may be determined. In addition to the value(s) associated with each node, a particular node may also indicate a relationship between the particular node and at least one other node. For example, each node, with the exception of the root node of the tree data structure 102, may include one parent node. Additionally, each node, with the exception of the leaf nodes of the tree data structure 102, may include one or more child nodes. Continuing the example, a node representing a category within an online catalog may be a parent with regard to a node representing a sub-category, which may in turn be a parent node with regard to a node representing an item. As discussed previously, traversing large portions of a tree data structure 102 responsive to a query 104 may consume significant time and computational resources.

One or more processing servers 106 may access a tree data structure 102 from one or more data sources 108. While FIG. 1 depicts the processing server(s) 106 as a single server, the processing server(s) 106 may include any number and any type of computing device(s) including, without limitation, servers, desktops, laptops, or other types of personal computers, smartphones, notebooks, tablet computers, palm-top computers, or other types of portable computing devices, wearable computing devices, automotive computing devices, gaming systems, smart televisions, set-top boxes, and so forth. Additionally, while FIG. 1 depicts a single data source 108, separate from the processing server(s) 106, in some implementations, the data source(s) 108 may be associated with the processing server(s) 106. For example, the data source(s) 108 may include memory or other types of data storage media of the processing server(s) 106.

A tree processing module 110 associated with the processing server(s) 106 may determine one or more linear chains 112 of nodes based on the tree data structure 102. For example, the tree processing module 110 may conceptually divide the nodes of the tree data structure 102 into one or more linear chains 112. A linear chain 112 may include a sub-tree data structure in which no single node is connected to more than two neighboring nodes. For example, a node within a linear chain 112 may be associated with one parent node and one child node. Nodes located at the end of a linear chain 112 may lack a parent node or a child node. In some cases, a linear chain 112 may include only a single node if the single node is connected to only one other node that is associated with a different linear chain 112. When compared to the linear chains 112, the initial tree data structure 102 may not necessarily be a linear data structure. For example, a node within a tree data structure 102 may have multipole child nodes associated therewith, creating a branched data structure instead of a linear data structure. Division of the tree data structure 102 into linear chains 112 may include conceptually associating each node with a linear chain 112, but may not include modifying the tree data structure 102 itself. For example, a group of nodes may be included within a linear chain 112, however, the connections between each node of the group of nodes with one another, and with other nodes not included in the linear chain 112, may remain unchanged. In some implementations, the tree processing module 110 may generate chain data indicative of associations between particular nodes and particular linear chains 112. For example, for each linear chain 112, chain data may indicate the group of nodes associated with the linear chain 112. In some implementations, the chain data may include a list data structure.

Division of the tree data structure 102 into linear chains 112 may increase the efficiency with which a response may be generated for a query 104. FIG. 1 depicts a user device 114 providing a query 104 to the processing server(s) 106. For example, the nodes of the tree data structure 102 may include data associated with financial transactions, and the query 104 may determine particular aspects of a transaction based on the values stored in multiple nodes. Continuing the example, a query 104 may determine one or more of a commission, tax, or item price associated with the sale of an item, based on values determined by traversing at least a portion of the tree data structure 102. The user device 114 may include any number and any type of computing device(s), including without limitation the types of computing devices described with regard to the processing server(s) 106. The query 104 may indicate at least two nodes in the tree data structure 102. For example, the query 104 may include a path sum query that indicates two nodes, responsive to which the sum of the values contained in a path of nodes between the two indicated nodes may be determined. A query processing module 116 associated with the processing server(s) 106 may receive and process the query 104. Responsive to the query 104, the query processing module 116 may perform a traversal 118 operation within the tree data structure 102. The traversal 118 operation may include traversing through each node along the path between the two nodes indicated in the query 104 to determine the path between the two indicated nodes. For example, the query processing module 116 may determine the lowest common ancestor node between the two indicated nodes, and the traversal 118 operation may include traversing through the common ancestor node. In some cases, a traversal 118 operation may include traversing between nodes within the same linear chain 112. In other cases, the traversal 118 operation may include traversing from one linear chain 112 to another linear chain 112. Each linear chain 112 that intersects the path taken by the traversal 118 operation may be traversed, however, because the linear chains 112 include a limited number of nodes and are linear in shape rather than branched, each linear chain 112 may be traversed more efficiently that other sub-tree data structures. After determining the nodes associated with the path between the two nodes indicated in the query 104, the query processing module 116 may determine the sum of the values of each node in the path, generate a response 120 based on the traversal operation 118, and provide the response 120 to the user device 114. While FIG. 1 depicts the user device 114 as a separate device from the processing server(s) 106, in some cases, the processing server(s) 106 may query the tree data structure 102.

Figure 2:
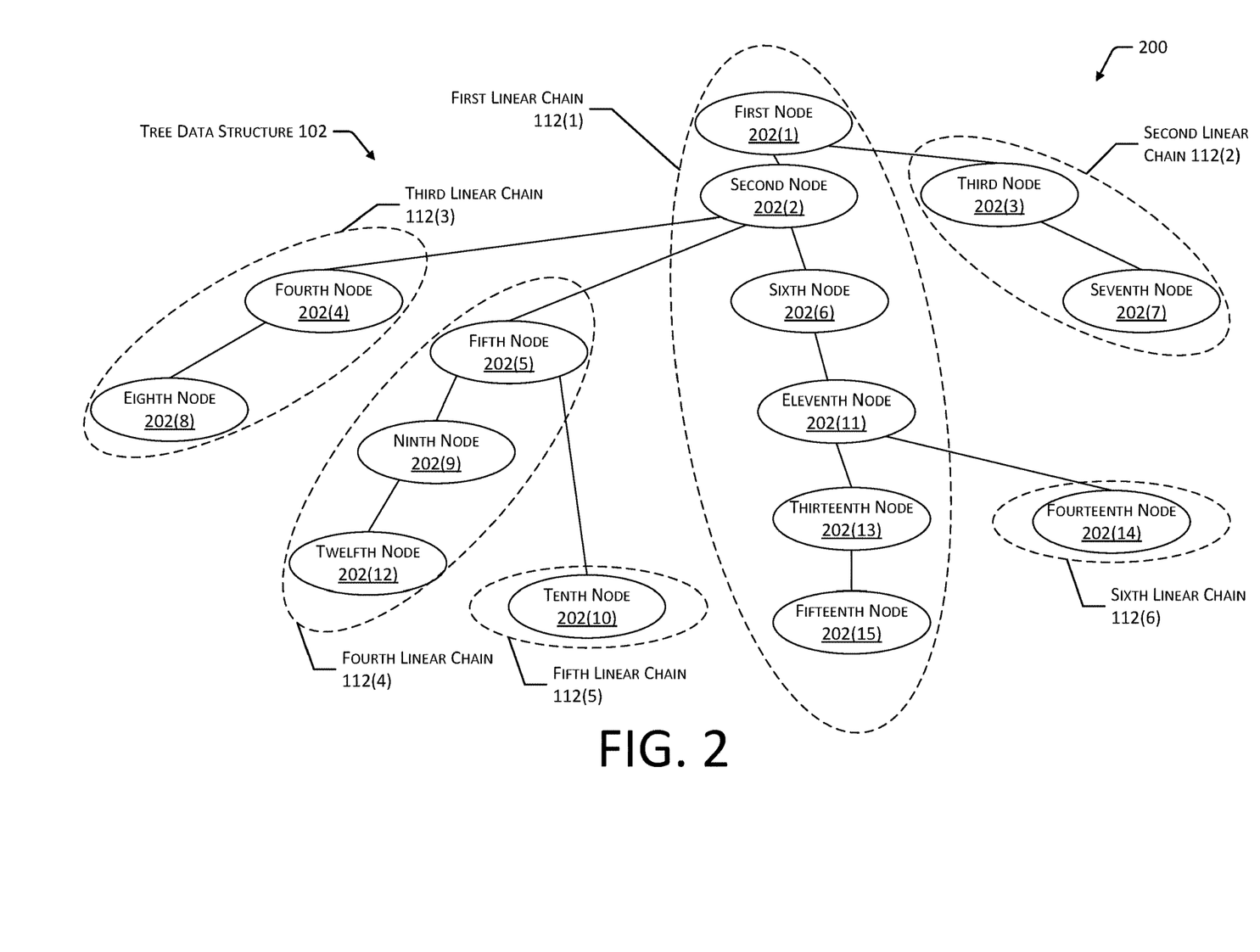
FIG. 2 is a diagram illustrating an example tree data structure divided into linear chains.

FIG. 2 is a diagram 200 illustrating an example tree data structure 102 divided into linear chains 112. As discussed previously, the tree data structure 102 may include a plurality of nodes 202, each node 202 connected to at least one other node 202 via one or more edges. The example tree data structure 102 shown in FIG. 2 includes fifteen nodes 202, however, in other implementations, a tree data structure 102 may include any number of nodes, including over one million nodes. A first node 202(1) is the root node of the tree data structure 102, while the second node 202(2) and third node 202(3) are child nodes with respect to the first node 202(1). A fourth node 202(4), fifth node 202(5), and sixth node 202(6) are child nodes with respect to the second node 202(2), and a seventh node 202(7) is a child node with respect to the third node 202(3). The seventh node 202(7) is a leaf node and does not include any child nodes. An eighth node 202(8) is a child node with respect to the fourth node 202(4) and is a leaf node that does not include any child nodes. A ninth node 202(9) and a tenth node 202(10) are child nodes with respect to the fifth node 202(5), and the tenth node 202(10) is a leaf node that does not include any child nodes. An eleventh node 202(11) is a child node with respect to the sixth node 202(6). A twelfth node 202(12) is a child node with respect to the ninth node 202(9) and is a leaf node that does not include any child nodes. A thirteenth node 202(13) and fourteenth node 202(14) are child nodes with respect to the eleventh node 202(11), and the fourteenth node 202(14) is a leaf node that does not include any child nodes. A fifteenth node 202(15) is a child node with respect to the thirteenth node 202(13) and is a leaf node that does not include any child nodes.

Each node 202 may store one or more values. Each node 202 may also store other data indicative of characteristics of the node 202 within the tree data structure 102. For example, a node 202 may include associated node data that indicates the relationship between the node 202 and one or more other nodes 202. Continuing the example, the eleventh node 202(11) may include node data indicating that it is a child node with respect to the sixth node 202(6) and a parent node with respect to the thirteenth node 202(13) and the fourteenth node 202(14). Each node 202 may also store data indicative of a count of descendant nodes associated with the particular node 202. For example, the first node 202(1) may store data indicative of fifteen descendant nodes, inclusive of the first node 202(1). The second node 202(2) may store data indicative of twelve descendant nodes, inclusive of the second node 202(2). The third node 202(3) may store data indicative of two descendant nodes, inclusive of the third node 202(3).

Data indicative of a count of descendant nodes may be used when forming linear chains 112. For example, a process for forming linear chains 112 may begin at the first node 202(1). Because the second node 202(2) includes a larger count of descendant nodes than the third node 202(3), the second node 202(2) may be included in a first linear chain 112(1) with the first node 202(1). Similarly, the sixth node 202(6) may be included in the first linear chain 112(1) due to the sixth node 202(6) having a larger count of descendant nodes than the fourth node 202(4) or the fifth node 202(5). The eleventh node 202(11) may be included in the first linear chain 112(1) due to the eleventh node 202(11) being the only child node associated with the sixth node 202(6). The thirteenth node 202(13) may be included in the first linear chain 112(1) due to the thirteenth node 202(13) having a larger count of descendant nodes than the fourteenth node 202(14). The fifteenth node 202(15) may be included in the first linear chain 112(1) as the sole child node of the thirteenth node 202(13). The first linear chain 112(1) may terminate at the fifteenth node 202(15) due to the fifteenth node 202(15) having no associated child nodes.

Additional linear chains 112 may be formed using the nodes 202 not included in the first linear chain 112(1). For example, a second linear chain 112(2) may include the third node 202(3), which was not included in the first linear chain 112(1) in favor of the second node 202(2). The second linear chain 112(2) may also include the seventh node 202(7), as the only child node associated with the third node 202(3). The second linear chain 112(2) may terminate at the seventh node 202(7) due to the seventh node 202(7) having no associated child nodes. In a similar manner, a third linear chain 112(3) may include the fourth node 202(4), which was not included in the first linear chain 112(1) in favor of the sixth node 112(6), and the eighth node 202(8), as the only child node of the fourth node 202(4).

A fourth linear chain 112(4) may include the fifth node 202(5), which was not included in the first linear chain 112(1) in favor of the sixth node 202(6). The ninth node 202(9) may also be included in the fourth linear chain 112(4), due to the ninth node 202(9) having a larger count of descendant nodes than the tenth node 202(10). The twelfth node 202(12) may also be included in the fourth linear chain 112(4) as the only child node associated with the ninth node 202(9).

The tenth node 202(10) may be included as the sole node in a fifth linear chain 112(5), because the tenth node 202(10) was not included in the fourth linear chain 112(4) in favor of the ninth node 202(9), and the tenth node 202(10) is not associated with any child nodes. Similarly, the fourteenth node 202(14) may be included as the sole node in a sixth linear chain 112(6), because the fourteenth node 202(14) was not included in the first linear chain 112(1) in favor of the thirteenth node 202(13), and the fourteenth node 202(14) is not associated with any child nodes.

Figure 3:
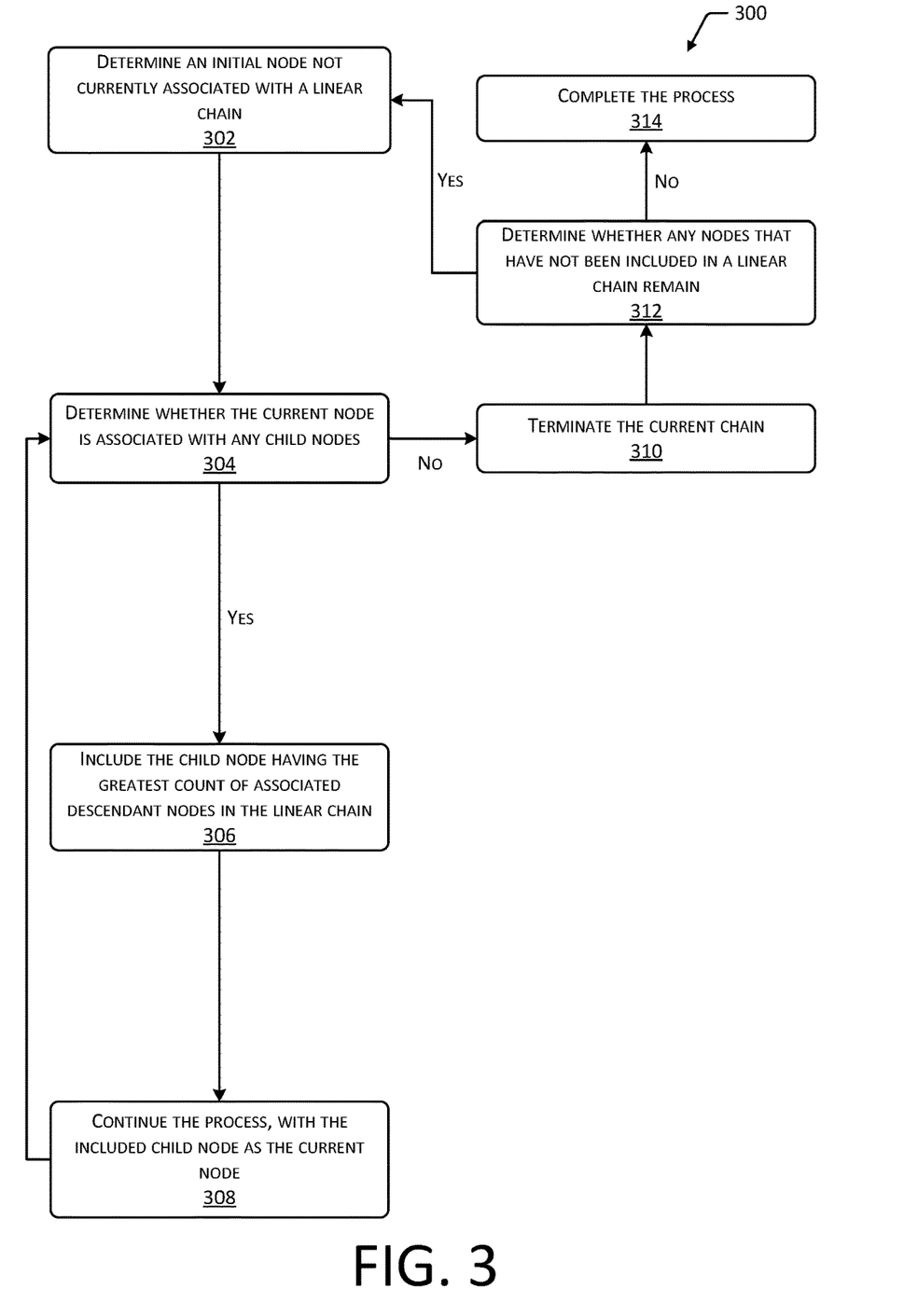
FIG. 3 is a flow diagram illustrating a method for forming linear chains within a tree data structure containing multiple nodes.

FIG. 3 is a flow diagram 300 illustrating a method for forming linear chains 112 within a tree data structure 102 containing multiple nodes 202. Block 302 determines an initial node 202 not currently associated with a linear chain 112. For example, the initial node 202 may include the root node of a tree data structure 102. In other cases, if one or more linear chains 112 have already been determined, the initial node 202 may include another node 202 within the tree data structure 102, such as a node 202 adjacent to a linear chain 112 that was not included in the linear chain 112 in favor of another node 202.

Block 304 determines whether the current node 202 is associated with any child nodes. A node 202 in a tree data structure 102 may be associated with any number of child nodes. For example, a node 202 may include zero associated child nodes, one associated child node, or multiple associated child nodes. Node data associated with the current node 202 may indicate the relationship between the current node 202 and one or more other nodes 202, which may indicate whether the current node 202 is associated with any child nodes.

If one or more child nodes are associated with the current node 202, block 306 includes the child node having the greatest count of associated descendant nodes in the linear chain 112. If the current node 202 includes a single associated child node, then the sole child node may be included in the linear chain 112 without comparing the count of descendant nodes with that of another node 202. However, if the current node 202 includes multiple associated child nodes, block 306 may include determining the counts of descendant nodes associated with each child node, and determining the greatest count of descendent nodes from among each of the child nodes. In cases where more than one child node is associated with the greatest count of descendent nodes, block 306 may include any of the child nodes associated with the greatest count in the linear chain 112. For example, if two child nodes have the same count of descendant nodes, one of the child nodes may be randomly selected for inclusion in the linear chain 112. In other implementations, secondary factors associated with the nodes may be used to determine which of the child nodes to include in the linear chain 112. For example, the value associated with a node 202 or other characteristics of the node 202 may cause a particular child node to be selected for inclusion in a linear chain 112 over a different child node.

Block 308 continues the process for forming the linear chain 112, with the included child node as the current node 202. For example, after including a child node in the linear chain 112, block 304 may be repeated by determining whether the included child node is associated with any child nodes. Block 306 may be repeated if the included child node is associated with one or more other child nodes. Blocks 304 through 308 may be repeated until a node 202 that is not associated with any child nodes is included in the linear chain 112.

Block 310 may terminate the linear chain 112 when it is determined that the current node 202 is not associated with any child nodes. When the linear chain 112 is terminated, the current node 202 may become the final node that is included in the linear chain 112, and the process may continue by forming one or more additional linear chains 112.

For example, block 312 may determine whether any nodes 202 that have not been included in a linear chain 112 remain in the tree data structure 102. If any nodes 202 not included in a linear chain 112 remain, block 302 may be repeated by selecting one of the nodes 202 not included in a linear chain 112 as an initial node 202. Then, blocks 304 through 310 may be repeated with regard to the selected initial node 202 and any child nodes associated therewith. If all nodes 202 within a tree data structure 102 are included in respective linear chains 112, block 314 may complete the process for forming linear chains 112.

Figure 4:
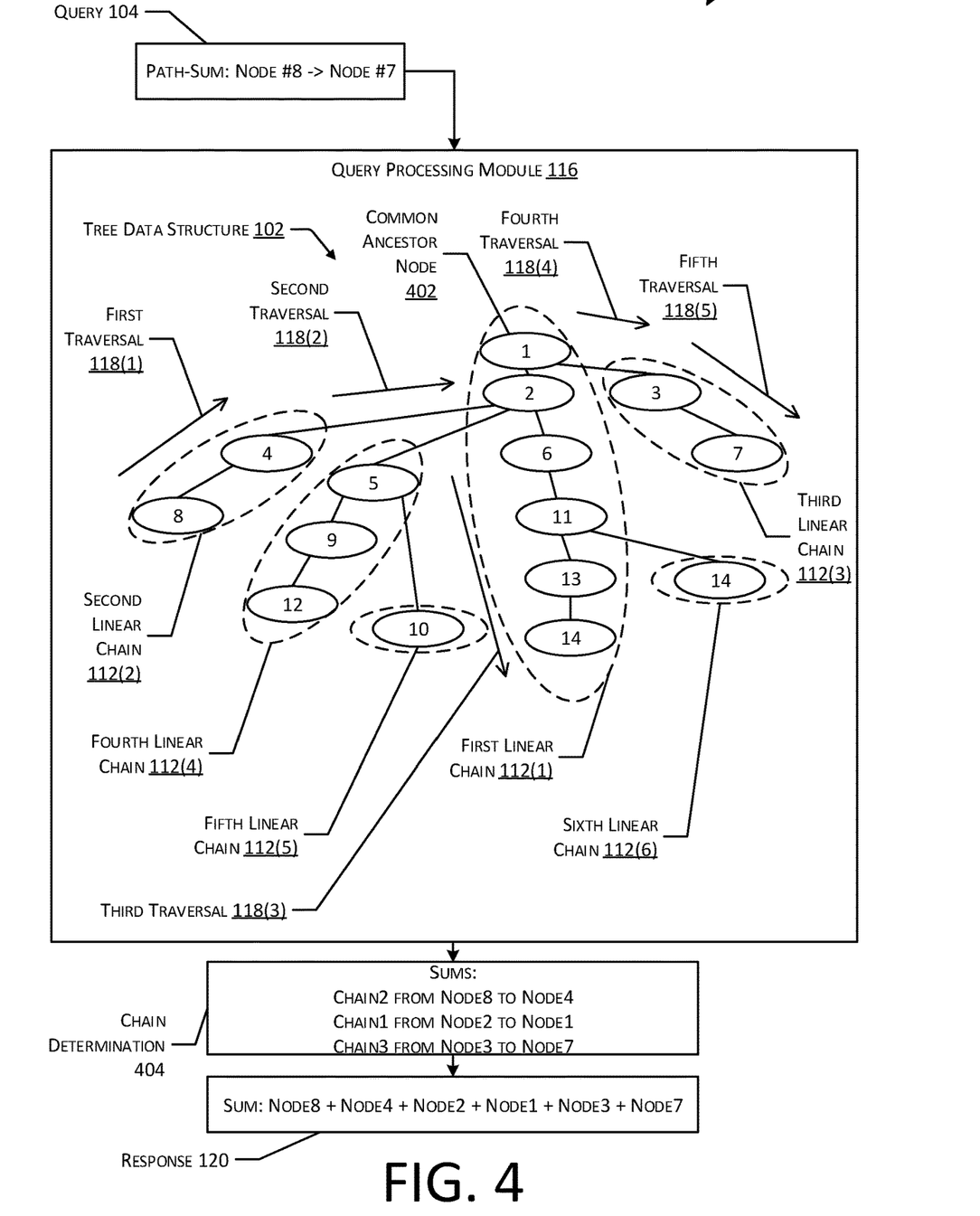
FIG. 4 is a block diagram depicting an example traversal operation performed by a query processing module.

FIG. 4 is a block diagram 400 depicting an example traversal 118 operation performed by a query processing module 116. As discussed with regard to FIG. 1, the query processing module 116 may receive and process a query 104 indicating one or more nodes 202 within a tree data structure 102. For example, a tree data structure 102 may store values indicative of devices within a network and characteristics of the devices. A query 104 may be used to determine a path of devices through which a data packet was routed, characteristics of one or more devices within the network, and so forth. In some cases, the query 104 may include a path sum query that indicates two nodes 202 and requests the sum of the values for each node 202 along the path of nodes 202 between the two indicated nodes 202. For example, a query 104 may determine latency or other metric values associated with a path of devices that routed a data packet. Continuing the example, a query 104 may request a path sum value and indicate the eighth node 202(8) and the seventh node 202(7), shown in FIG. 2.

In the example tree data structure 102, the first node 202 indicated in the query 104 may be included in the second linear chain 112(2), while the second node 202 indicated in the query 104 may be in the third linear chain 112(3). The shortest path between the two indicated nodes 202 may pass through a common ancestor node 402. In some cases, one or more of the nodes 202 along the path between the two indicated nodes 202 may be included within the same linear chain 112. In other cases, one or more nodes 202 may be included in different linear chains 112 that do not include the nodes 202 indicated by the query 104. For example, referring to FIG. 2, the shortest path between the eighth node 202(8) and the seventh node 202(7) would include: the eighth node 202(8), the fourth node 202(4), the second node 202(2), the first node 202(1), the third node 202(3), and the seventh node 202(7). The eighth node 202(8) and the seventh node 202(7) are included in the second linear chain 112(2), the second node 202(2) and the first node 202(1) are included in the first linear chain 112(1), and the third node 202(3) and the seventh node 202(7) are included in the third linear chain 112(3).

As such, a traversal 118 operation to determine a path sum value for the nodes 202 between the eighth node 202(8) and seventh node 202(7) may determine a path that intersects three linear chains 112. FIG. 4 illustrates the traversal 118 operation including a first traversal 118(1) portion, which may include traversing within the second linear chain 112(2), from the eighth node 202(8) to the fourth node 202(4). A second traversal 118(2) portion may include traversing from the second linear chain 112(2) to the first linear chain 112(1), such as from the fourth node 202(4) to the second node 202(2). A third traversal 118(3) portion may include traversing within the first linear chain 112(1). A fourth traversal 118(4) portion may include traversing from the first linear chain 112(1) to the third linear chain 112(3), which may include traversing form the first node 202(1) to the third node 202(3). A fifth traversal 118(5) portion may include traversing within the third linear chain 112(3), which may include traversing form the third node 202(3) to the seventh node 202(7).

In some implementations, the traversal 118 operation may include accessing chain data associated with one or more of the linear chains 112. For example, chain data for a particular linear chain 112 may indicate other linear chains 112 that are adjacent thereto. Chain data may also indicate the particular nodes 202 that are included in each linear chain 112. Continuing the example, chain data may indicate that the eighth node 202(8) and fourth node 202(4) are within the same linear chain 112(2), such that the chain data may be used to determine the sum when traversing from the eighth node 202(8) to the fourth node 202(4). Similarly, the chain data may indicate that the second node 202(2) and first node 202(1) are within the same linear chain 112(1), such that the chain data may be used to determine the sum when traversing from the second node 202(2) to the first node 202(1). Additionally, the chain data may indicate that the third node 202(3) and seventh node 202(7) are within the same linear chain 112(3), such that the chain data may be used to determine the sum when traversing from the third node 202(3) to the seventh node 202(7). Therefore, when the traversal 118 operation reaches the second node 202(2) within the first linear chain 112(1), the chain data may indicate that the seventh node 202(7) indicated in the query 104 is included in the third linear chain 112(3). The chain data may further indicate that the third linear chain 112(3) is adjacent to the first linear chain 112(1). Therefore, the traversal 118 operation may not traverse from the first linear chain 112(1) to the fourth linear chain 112(4) or sixth linear chain 112(6).

The traversal 118 operation may determine the value for each node 202 located along the path between the indicated nodes 202 of the query 104. The chain data and the traversal 118 operation may be used to generate a chain determination 404 indicative of the partial sums of nodes 202 contained within the linear chains 112 traversed by the traversal 118 operation. The chain determination 404 may be used to generate a response 120 to the query 104.

Figure 5:
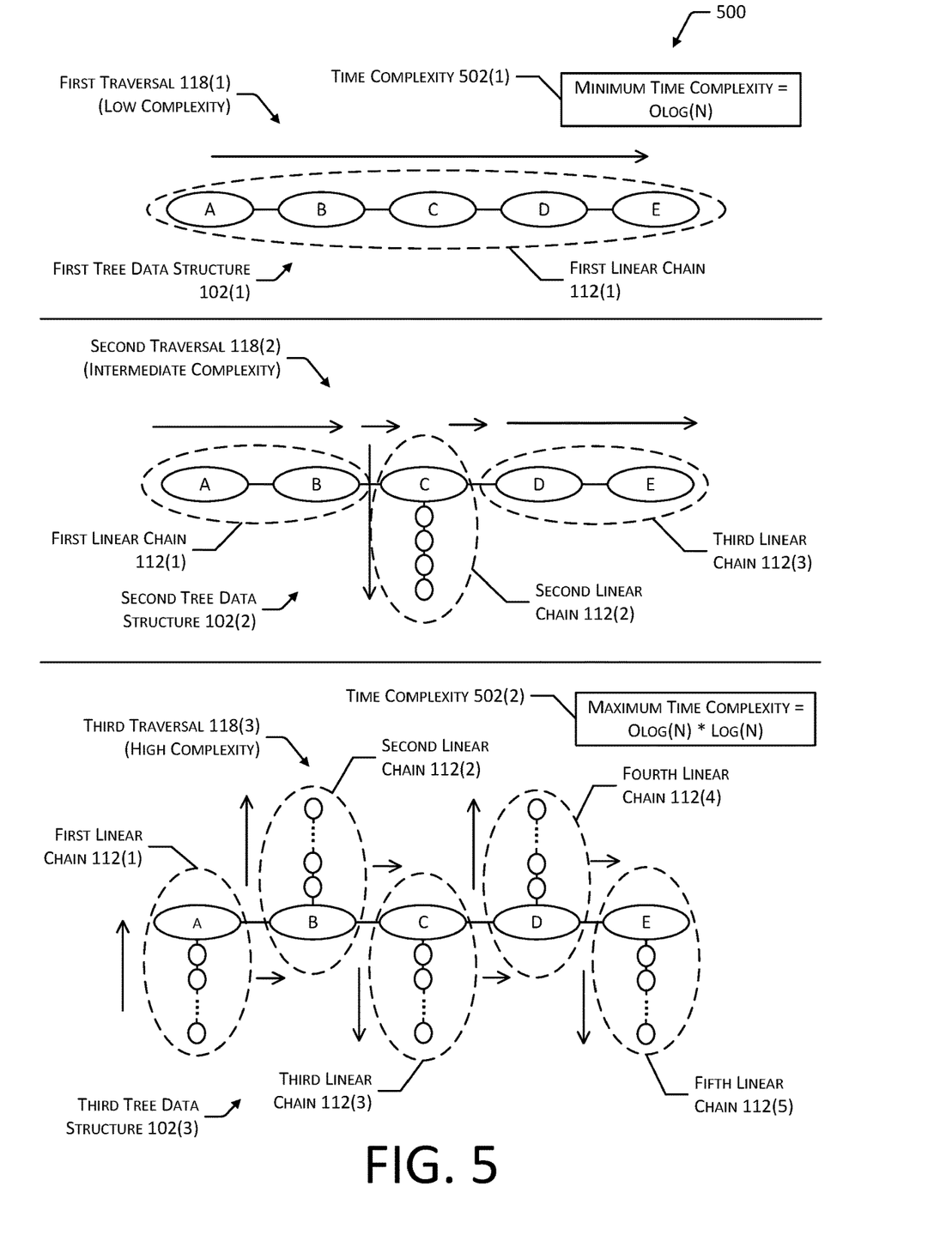
FIG. 5 is a series of diagrams illustrating example traversal operations and associated time complexity values.

FIG. 5 is a series of diagrams 500 illustrating example traversal 118 operations and associated time complexity 502 values. Specifically, FIG. 5 depicts a first traversal 118(1) that illustrates an operation having minimal complexity. FIG. 5 also depicts a second traversal 118(2) having intermediate complexity and a third traversal 118(3) that illustrates a high complexity.

The first traversal 118(1) illustrates a first tree data structure 102(1) in which five nodes 202 (nodes "A" through "E") are each included in the same linear chain 112(1). As such, a query 104 that indicates any two nodes within the linear chain 112(1) may be resolved by traversing within the linear chain 112(1). As a result, the time complexity 502(1) associated with the first traversal 118(1) may be reduced to O Log(N), where N is the number of nodes 202 within the first tree data structure 102(1). In comparison, as discussed previously, the time complexity 502 associated with traversing a branched tree data structure 102 rather than a linear chain 112 may be O(|N|).

The second traversal 118(2) illustrates a second tree data structure 102(2) in which five nodes 202 (nodes "A" through "E") are included in three different linear chains 112. For example, two nodes 202 ("A" and "B") may be included in a first linear chain 112(1), a particular node 202 ("C") and one or more additional nodes 202 may be included in a second linear chain 112(2), and two nodes 202 ("D" and "E") may be included in a third linear chain 112(3). A traversal 118(2) from node "A" to node "E" would include traversing within the first linear chain 112(1), the second linear chain 112(2), and the third linear chain 112(3). As a result, nodes within the second linear chain 112(2) that are not included along the shortest path between nodes "A" and "E" may be traversed. However, the time complexity 502 associated with traversing through linear chains 112 may be less than the time complexity 502 associated with traversing a branched tree data structure 102.

The third traversal 118(3) illustrates a scenario in which each node 202 along the path from node "A" to node "E" is included in a different respective linear chain 112 that includes one or more other nodes 202. For example, each linear chain 112 may include a sufficient number of nodes 202 such that if the process described with regard to FIG. 3 is performed, the tree data structure 102(3) may be divided into five linear chains 112, each linear chain 112 containing one of nodes "A" through "E". Thus, the shortest path between node "A" and node "E" intersects each of the five linear chains 112. Traversing from node "A" to node "E" would therefore include traversing within the first linear chain 112(1), second linear chain 112(2), third linear chain 112(3), fourth linear chain 112(4), and fifth linear chain 112(5). However, because traversing within linear chains 112 may occur more efficiently than traversing within a branched tree data structure 102, the time complexity 502 associated with such a traversal is O Log(N) rather than O(|N|). When traversing along a path of nodes 202, the maximum number of linear chains 112 that may be intersected is equal to the number of nodes 202 along the path, and each linear chain 112 may be traversed with a time complexity 502 of O Log(N). Therefore, in a worst-case scenario, the maximum time complexity 502(2) for traversing a path in which every node 202 is included in a different linear chain 112 would be O Log(N)*Log(N), which is less than the time typically required to traverse a branched tree data structure 102. Additionally, the difference between the time complexity 502(2) of O Log(N)*Log(N) and the standard time complexity of O(|N|) associated with traversing branched tree data structures 102 becomes greater as the total number of nodes 202 within the tree data structure 102 increases.

Figure 6:
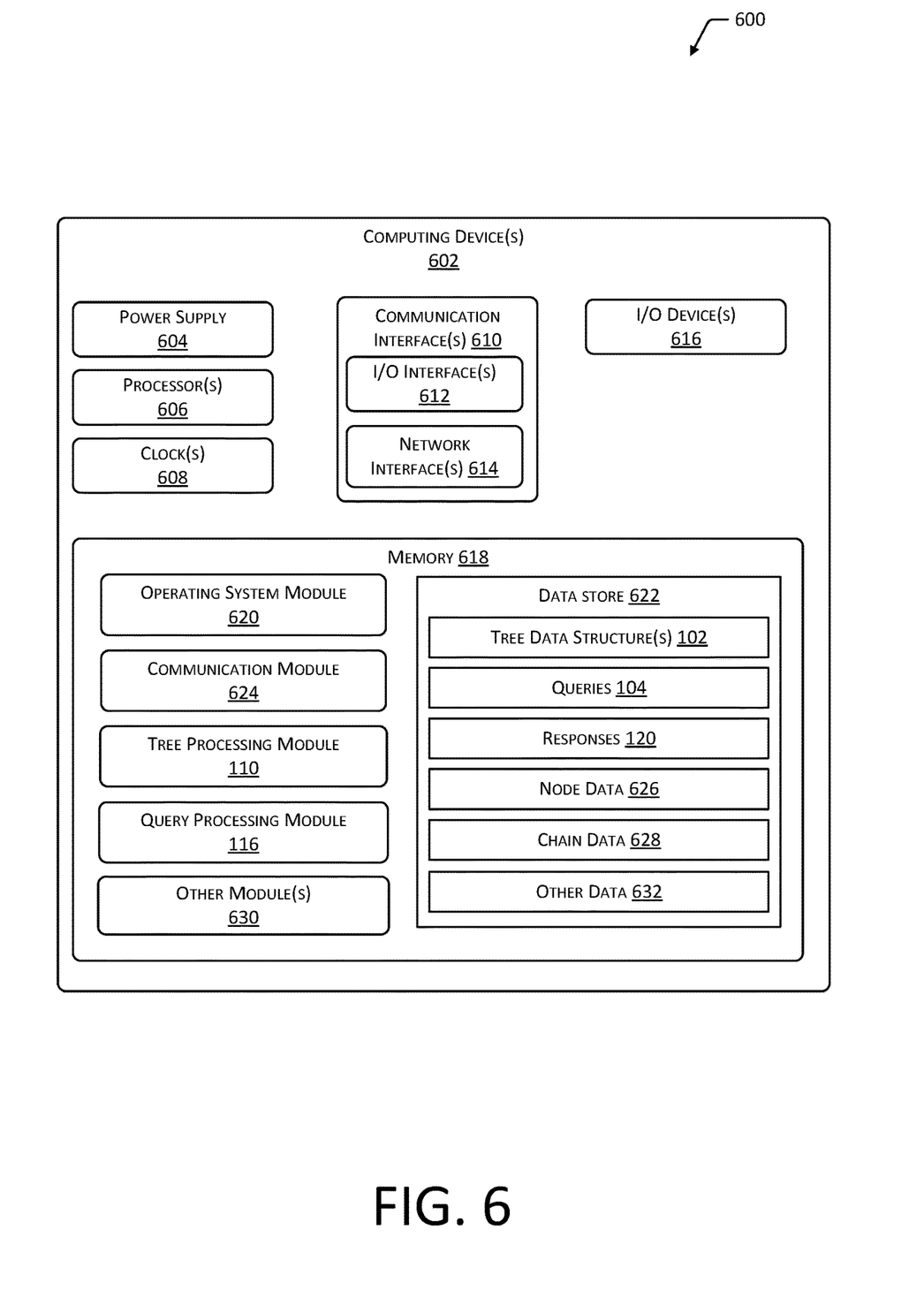
FIG. 6 is a block diagram illustrating an implementation of computing device within the scope of the present disclosure.

FIG. 6 is a block diagram 600 illustrating an implementation of a computing device 602 within the scope of the present disclosure. The computing device 602 may include one or more processing servers 106, user devices 114, or other computing devices 602 in communication therewith. While FIG. 6 depicts a single block diagram 600 illustrating a single computing device 602, in other implementations, any number and any combination of one or multiple types of computing devices 602 may be used to perform any of the functions described herein, such as by using a distributed network of computing devices 602.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock 608 to generate a timestamp, trigger a preprogrammed action, and so forth.

The computing device 602 may include one or more communication interface(s) 610, such as input/output (I/O) interface(s) 612, network interface(s) 614, and so forth. The communication interfaces 610 may enable the computing device 602, or components of the computing device 602, to communicate with other computing devices 602 or components thereof. The I/O interface(s) 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O device(s) 616. The I/O devices 616 may include any manner of input device or output device associated with the computing device 602 or with another computing device 602 in communication therewith. For example, I/O devices 616 may include touch sensors, keyboards, mouse devices, microphones, image sensors (e.g., cameras), scanners, displays, speakers, haptic devices, printers, motion sensors, location sensors, and so forth. In some implementations, the I/O device(s) 616 may be physically incorporated with a computing device 602 or may be externally placed.

The network interface(s) 614 may be configured to provide communications between the computing device 602 and other devices, such as the I/O devices 616, routers, access points, and so forth. The network interface(s) 614 may include devices configured to couple to one or more networks, including local area networks (LANs), wireless LANs, wide area networks (WANs), wireless WANs, and so forth. For example, the network interfaces 614 may include computing devices 602 compatible with Ethernet, Wi-Fi, Wi-Fi Direct, Bluetooth, Bluetooth Low Energy, ZigBee, Z-Wave, 3G, 4G, LTE, and so forth.

The computing device 602 may include one or more buses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 622 and one or more of the following modules may also be stored in the memory 618. The modules may be executed as foreground applications, background tasks, daemons, and so forth. The data store 622 may use a flat file, database, linked list, tree, executable code, script, or other data structure to store information. In some implementations, the data store 622 or a portion of the data store 622 may be distributed across one or more other devices including other computing devices 602, network attached storage devices, and so forth.

A communication module 624 stored in the memory 618 may be configured to establish communications with or other computing devices 602. For example, the communication module 624 may communicate with data sources 108, user devices 114, and so forth to receive tree data structures 102, queries 104, and other data.

The memory 618 may also store the tree processing module 110. The tree processing module 110 may determine one or more linear chains 112 of nodes 202 based on a tree data structure 102. As discussed previously, one implementation by which linear chains 112 may be determined may include accessing node data 626 indicative of the characteristics of particular nodes 202 within the tree data structure 102. For example, node data 626 for a particular node 202 may include a node identifier that differentiates the particular node 202 from other nodes 202, as well as one or more values associated with the node 202. Node data 626 may also indicate relationships between the node 202 and one or more other nodes 202, such as parent relationships, child relationships, sibling relationships, or more remote relationships, such as an indication of an ancestor or descendant relationship with regard to one or more other nodes 202. Node data 626 may additionally indicate a count of descendant nodes associated with the particular node 202. As described with regard to FIG. 4, a linear chain 112 may be formed by beginning with an initial node 202, then determining the child node of the initial node 202 that includes a greatest count of associated descendant nodes 202. If more than one child node includes the greatest count of descendant nodes 202, the tree processing module 110 may select a particular child node at random or based on other elements of the node data 626, for inclusion in the linear chain 112.

The tree processing module 110 may also generate chain data 628 indicative of the particular nodes 202 that are included in respective linear chains 112. For example, the chain data 628 may include one or more lists, tables, or other types of data structures that associate a particular linear chain 112 with each node 202 included in the linear chain 112. Chain data 628 may be used to determine the particular nodes 202 and linear chains 112 that may be traversed during a traversal 118 operation.

The memory 618 may additionally store the query processing module 116. The query processing module 116 may receive one or more queries 104 and perform traversal 118 operations on the tree data structure(s) 102 that are processed by the tree processing module 110 to generate responses 120 to the queries 104. For example, in response to a query 104 specifying a path sum value for two particular nodes 202 in a tree data structure 102, the query processing module 116 may determine a common ancestor node 402 for the two nodes 202 in the query 104. The query processing module 116 may then perform a traversal 118 along the path of nodes 202 between the two identified nodes 202 in the query 104, as well as within any linear chains 112 intersected by the path.

Other modules 630 may also be present in the memory 618. For example, encryption modules may be used to encrypt and decrypt communications between computing devices 602. User interface modules may be configured to receive and modify user settings, configurations, and preferences, default settings, and so forth.

Other data 632 within the data store 622 may include default configurations and settings associated with computing devices 602, rules and algorithms regarding the formation of linear chains 112, and so forth. Other data 628 may also include security data, such as encryption keys and schema, access credentials, and so forth.

In different implementations, different computing devices 602 may have different capabilities or capacities. For example, processing servers 106 may have significantly more processor 606 capability and memory 618 capacity compared to the processor 606 capability and memory 618 capacity of user devices 114.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
   access a tree data structure that includes a plurality of nodes representing one or more of catalog data, transaction data, or network data;
   divide the tree data structure into at least a first linear chain of nodes and a second linear chain of nodes;
      wherein the first linear chain of nodes includes a first subset of the plurality of nodes and each node of the first linear chain is associated with two or fewer neighboring nodes that are within the first linear chain; and
      wherein the second linear chain of nodes includes a second subset of the plurality of nodes and each node of the second linear chain is associated with two or fewer neighboring nodes that are within the second linear chain;
   generate first chain data indicative of the first subset;
   generate second chain data indicative of the second subset;
   receive a query indicative of a value for a path of nodes between a first node of the first subset and a second node of the second subset, the value indicative of one or more of: a characteristic of one or more items within a catalog, one or more characteristics of a financial transaction, or a path associated with transmission of a data packet within one or more networks;
   based on the first chain data, traverse at least a portion of the first linear chain of nodes;
   traverse the tree data structure from the first linear chain of nodes to the second linear chain of nodes;
   based on the second chain data, traverse at least a portion of the second linear chain of nodes;
   generate a response to the query based on values determined by traversal of the at least a portion of the first linear chain of nodes, traversal of the tree data structure from the first linear chain of nodes to the second linear chain of nodes, and traversal of the at least a portion of the second linear chain of nodes; and
   output the response to the query.

2. The system of claim 1, further comprising computer-executable instructions to:
determine the first linear chain of nodes by:
   determining a first parent node of the plurality of nodes;
   determining a first child node of the first parent node;
   determining a first count of descendant nodes associated with the first child node;
   determining a second child node of the first parent node;
   determining a second count of descendant nodes associated with the second child node;
   determining that the first count is larger than the second count; and
   indicating at least the first parent node and the first child node in the first chain data; and
determine the second linear chain of nodes by:
   indicating at least the second child node in the second chain data.

3. The system of claim 1, further comprising computer-executable instructions to:
responsive to the query, determine a lowest common ancestor node associated with the first node and the second node;
wherein traversal of the tree data structure from the first linear chain of nodes to the second linear chain of nodes includes traversing through the lowest common ancestor node.

4. The system of claim 1, further comprising computer-executable instructions to:
determine an addition of one or more nodes to the tree data structure;
include at least a subset of the one or more nodes in a third linear chain of nodes without modifying the first linear chain of nodes and the second linear chain of nodes; and
generate third chain data indicative of the at least a subset of the one or more nodes.

5. A method comprising:
accessing a tree data structure, wherein the tree data structure includes a plurality of nodes;
dividing the plurality of nodes into at least a first linear chain of nodes and a second linear chain of nodes;
   wherein each node of the first linear chain is associated with two or fewer neighboring nodes that are within the first linear chain; and
   wherein each node of the second linear chain is associated with two or fewer neighboring nodes that are within the second linear chain;
generating chain data indicative of nodes included in the first linear chain and the second linear chain;
receiving a query associated with one or more of: a first node of the plurality of nodes or a second node of the plurality of nodes;
responsive to the query and based on the chain data, traversing at least one of the first linear chain of nodes or the second linear chain of nodes;
generating a response to the query based at least in part on the traversing of the at least one of the first linear chain of nodes or the second linear chain of nodes; and
outputting the response.

6. The method of claim 5, further comprising:
determining a first parent node of the plurality of nodes;
determining a first count of descendant nodes associated with a first child node of the first parent node;
determining a second count of descendent nodes associated with a second child node of the first parent node; and
determining that the first count is greater than or equal to the second count;
wherein the chain data associates the first linear chain with a first indication of at least the first parent node and the first child node; and
wherein the chain data further associates the second linear chain with a second indication of at least the second child node.

7. The method of claim 6, further comprising:
determining that a third child node directly descends from the first child node, wherein the first child node includes no other direct descendant nodes than the third child node; and
wherein the chain data further associates the first linear chain with a third indication of the third child node.

8. The method of claim 6, further comprising:
determining that at least a third child node and a fourth child node directly descend from the first child node;

determining a third count of descendant nodes associated with the third child node;

determining a fourth count of descendant nodes associated with the fourth child node; and determining that the third count is greater than or equal to the fourth count;

wherein the chain data further associates the first linear chain with a third indication of the third child node; and wherein the chain data associates a third linear chain of nodes with a fourth indication of at least the fourth child node.

9. The method of claim 5, wherein a first period of time associated with the traversing the at least one of the first linear chain of nodes or the second linear chain of nodes is less than a second period of time associated with performing one or more of a depth-first-search or a breadth-first-search based on the query.

10. The method of claim 5, wherein the first node is associated with the first linear chain and the second node is associated with the second linear chain, the method further comprising:

determining a common ancestor node of the first node and the second node;

traversing from the first linear chain to the second linear chain, wherein the traversing from the first linear chain to the second linear chain includes traversing through the common ancestor node; and traversing at least a portion of the second linear chain;

wherein the response to the query is further based on the traversing from the first linear chain to the second linear chain and the traversing of the at least a portion of the second linear chain.

11. The method of claim 5, wherein the first node and the second node are associated with the first linear chain, and the chain data is indicative of at least two nodes within the first linear chain.

12. The method of claim 5, further comprising:

determining an addition of one or more nodes to the tree data structure; and associating the one or more nodes with at least a third linear chain of nodes without modifying the first linear chain of nodes or the second linear chain of nodes.

13. A system comprising:

one or more memories storing computer-executable instructions; and one or more hardware processors to execute the computer-executable instructions to:

access a tree data structure that includes a plurality of nodes;

divide the plurality of nodes into at least a first linear chain of nodes and a second linear chain of nodes;

wherein the first linear chain includes a first subset of the plurality of nodes and each node of the first linear chain is associated with two or fewer neighboring nodes that are within the first linear chain; and wherein the second linear chain includes a second subset of the plurality of nodes and each node of the second linear chain is associated with two or fewer neighboring nodes that are within the second linear chain;

generate chain data indicative of nodes included in the first linear chain and the second linear chain;

receive a query associated with a first node and a second node;

determine based on correspondence between the query and the chain data, that the first node is associated with the first linear chain and the second node is associated with the second linear chain;

based on the correspondence between the query and the chain data, generate a response to the query by traversing at least a portion of the first linear chain, traversing the tree data structure from the first linear chain to the second linear chain, and traversing at least a portion of the second linear chain; and output the response.

14. The system of claim 13, wherein a first parent node of the first subset is associated with a plurality of child nodes, the system further comprising computer-executable instructions to:

determine a first count of descendant nodes associated with a first child node of the plurality of child nodes; and determine that the first count is greater than or equal to counts of descendant nodes for each other child node of the plurality of child nodes;

wherein the chain data associates the first child node with the first linear chain of nodes.

15. The system of claim 14, further comprising computer-executable instructions to:

determine that a second count of descendant nodes associated with the second node is greater than zero;

wherein the chain data includes an association between the second linear chain of nodes and at least one descendant node of the second count of descendent nodes.

16. The system of claim 14, further comprising computer-executable instructions to:

determine that a second count of descendant nodes associated with the second node is zero;

wherein the chain data includes an association between the second linear chain of nodes and only the second node.

17. The system of claim 13, further comprising computer-executable instructions to:

responsive to the query, determine a common ancestor node associated with the first node and the second node, wherein traversing the tree data structure from the first linear chain to the second linear chain includes traversing through the common ancestor node.

18. The system of claim 13, wherein traversing the tree data structure from the first linear chain to the second linear chain includes:

traversing at least one intermediate node between the first node and the second node; and traversing at least one third linear chain of nodes associated with the at least one intermediate node.

19. The system of claim 13, wherein a first period of time associated with the traversing at least a portion of the first linear chain, the traversing the tree data structure from the first linear chain to the second linear chain, and the traversing at least a portion of the second linear chain is less than a second period of time associated with performing one or more of a depth-first-search or a breadth-first-search based on the query.

20. The system of claim 13, further comprising computer-executable instructions to:

determine an addition of one or more nodes to the tree data structure; and associate the one or more nodes with at least a third linear chain of nodes without modifying the first linear chain of nodes and the second linear chain of nodes.

* * * * *